(No Model.)

H. HOWSON.
LOCK NUT.

No. 258,422. Patented May 23, 1882.

Witnesses:
Harry Drury
Harry Smith

Inventor:
Henry Howson
by his Attorneys
Howson and Son

UNITED STATES PATENT OFFICE.

HENRY HOWSON, OF PHILADELPHIA, PENNSYLVANIA, ASSIGNOR TO ALLEN MIDDLETON, OF SAME PLACE.

LOCK-NUT.

SPECIFICATION forming part of Letters Patent No. 258,422, dated May 23, 1882.

Application filed March 29, 1882. (No model.)

*To all whom it may concern:*

Be it known that I, HENRY HOWSON, a citizen of the United States, and a resident of Philadelphia, Pennsylvania, have invented certain Improvements in Lock-Nuts, of which the following is a specification.

My invention relates to that class of nut-locking devices in which portions of the metal of the nut, on tightening the same, are displaced and forced against the threaded stem of a bolt, so as to prevent the nut from becoming loose; and my invention, which is fully described hereinafter, has for its object the simple and economical manufacture of nut-locking devices of this class.

Figure 1:
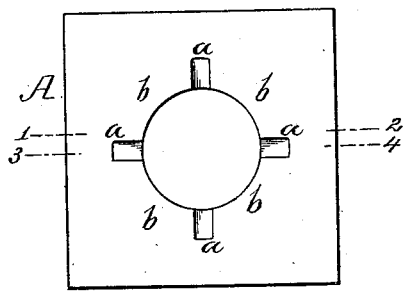
Figure 2:
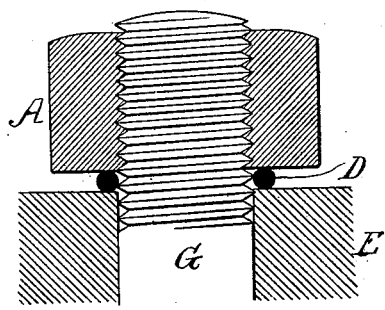
Figure 3:
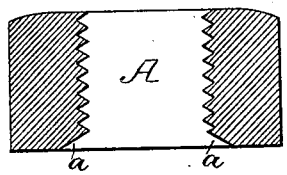
Figure 4:
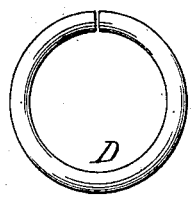
Figure 5:
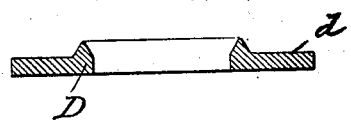
Figure 6:
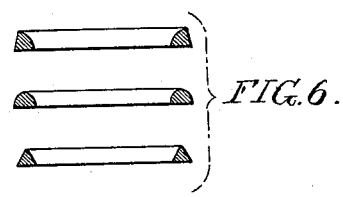
Figure 7:
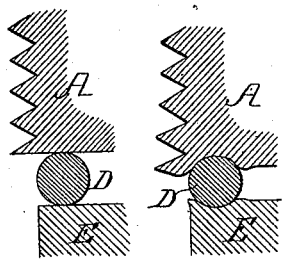

In the accompanying drawings, Figure 1 is an inverted plan view of a nut-blank prepared for carrying my invention into effect; Fig. 2, a vertical section on the line 1 2, Fig. 1, showing the threaded stem of a bolt and the ring interposed between the nut and the object confined thereby; Fig. 3, a vertical section of the nut on the line 3 4; Fig. 4, a detached view of the ring; Fig. 5, a sectional view of another kind of ring having an outer flange; Fig. 6, views of rings made of differently-shaped wires; and Fig. 7, enlarged views, showing the effect of the ring on the nut when the latter is tightened.

The nut A may be six-sided, or it may be square, as shown, and differs from ordinary nuts in no respect excepting that notches $a$— four in the present instance—are made in the under face of the nut at the entrance to the opening of the same, these notches being preferably inclined, as shown in Fig. 3. The notches may be readily made in the nut-blank, while the latter is hot, by the aid of a suitable instrument, after which the nut may be threaded in the usual manner; or the notches may be made, after the nut has been threaded, by a suitable cutting-tool. By notching the under side of the nut as many segments $b$ as there are notches are formed at the lower entrance to the opening, and these segments are necessarily weaker than other parts of the nut. If the nut be applied to the threaded stem of a bolt, G, and a ring, D, preferably of harder metal than the nut, be interposed between the latter and the object E, and the nut be tightened with the view of confining the object, the metal of the segments $b$ must be displaced and forced inward, and must so tightly hug the threaded stem of the bolt that the nut cannot become loose, the effect produced by the ring being that indicated in Fig. 7. The ring need not be continuous. It may be made, for instance, by bending a simple piece of steel wire to the annular shape shown in Fig. 4; or the wire, instead of being round in section, may be of any of the shapes shown in Fig. 6; or the ring may consist of an annular V-shaped or rounded rib, D, provided with an outer flange, $d$, as shown in Fig. 4, the object to be attained being a displacement of the metal of the segments toward the center of the nut. When rings of the shape shown in Fig. 6 are used the flat side of the ring should be in contact with the object confined by the nut.

I claim as my invention—

1. A nut-locking device in which a nut, A, notched in its under face so as to form segments $b$, is combined with a ring, D, which is interposed between the object to be confined by the nut and the said segments $b$ of the same, all substantially as and for the purpose set forth.

2. As a new manufacture, the ring D, having an outer flange, $d$, substantially as shown and described.

3. The combination of the notched nut A with the ring D and its flange $d$, as specified.

In testimony whereof I have signed my name to this specification in the presence of two subscribing witnesses.

HENRY HOWSON.

Witnesses:
HARRY DRURY,
HARRY SMITH.